March 7, 1939. C. O. WOOD 2,149,485
MOTOR CONTROL SYSTEM
Filed July 6, 1937
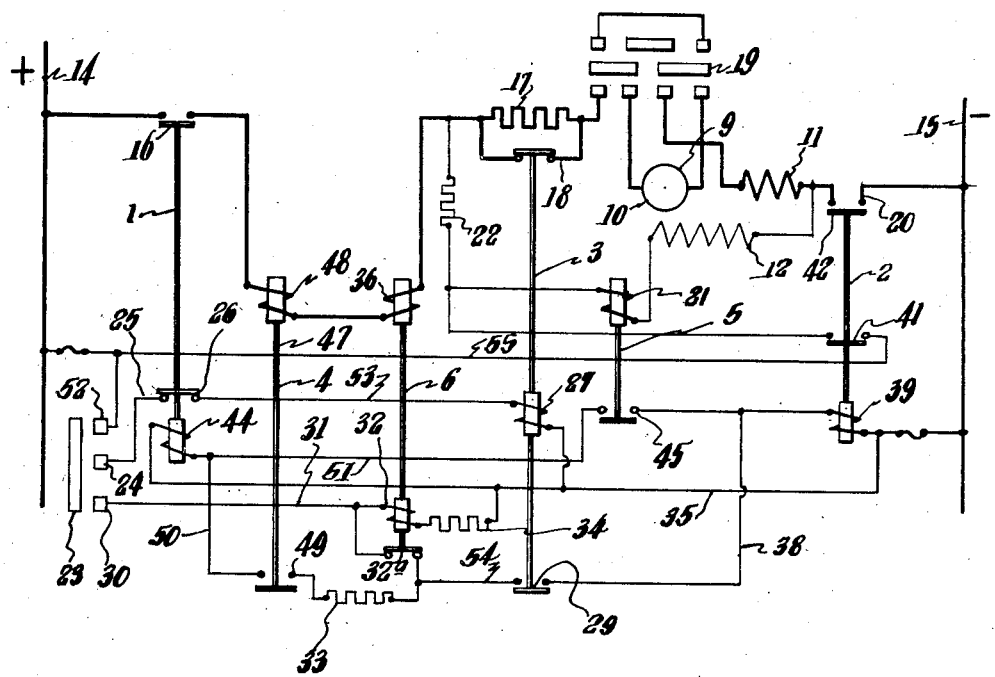
Inventor
Claude O Wood
Clarence F. Poole
Attorney Patented Mar. 7, 1939

2,149,485

UNITED STATES PATENT OFFICE 2,149,485

MOTOR CONTROL SYSTEM

Claude O. Wood, Chicago, Ill., assignor to Goodman Manufacturing Company, Chicago, Ill., a corporation of Illinois Application July 6, 1937, Serial No. 152,066

12 Claims. (Cl. 172—288)

This invention relates to improvements in a motor control system and more particularly to an automatic control system for a motor having shunt field windings and subjected to frequent power interruptions.

In automatic control systems of the contactor type for motors where there are large fluctuations in voltage, and where the power is frequently cut off from the motor circuit for short intervals, the regenerative voltage of the motor is usually enough to hold the contactors closed even though the power circuit is interrupted for a short period of time. This is especially true when the motors are used in mining machines underground while tramming from place to place by holding a trolley nip or hook on the trolley wire. In case the power is interrupted by removing the nip from the trolley wire for a short period of time, the armature of the motor may sometimes coast for a considerable period of time. If it remains electrically connected to its shunt field windings, it will generate a potential sufficient to keep the shunt field windings partly energized, thus continuing to create potential which is sufficient to hold all of the control mechanism in the full running position. The majority of commercial automatic control systems of the contactor type will remain closed and in their running position even though the voltage may drop to less than one-half of its rated value.

In cases where the motor has been disconnected from its source of power and acts as a generator, generating sufficient voltage to hold the control mechanism in the running position, and the motor slows down to about one-half its normal speed, trouble is very likely to be encountered when the source of power is again suddenly applied to the motor. There will be a sudden inrush of current through the armature which will not be controlled by the starting resistance which is ordinarily provided for this purpose. The shunt field current in the motor will be far below its normal value. With the field current below normal, the starting torque of the motor will be low and the time required for armature acceleration will be considerably longer than it should be. The counter-electromotive force generated by the motor will be low during this period which will cause a very heavy inrush of current through the armature which is hard on the motor and results in commutator or brush holder trouble.

The principal objects of my invention are to remedy these difficulties by providing an improved motor control circuit which is so arranged as to prevent the application of full line voltage to the armature of the motor when power is restored to the circuit after a temporary interruption and insure that the motor have a normal shunt field current flowing before power can be applied to the armature and also insure that the regular starting resistance of the motor be inserted in the armature circuit before power can be applied to the armature.

Another object of my invention is to so arrange the system that the flow of power to the armature will be disconnected if the line voltage drops to such a point as to cause the shunt field current to fall below a predetermined minimum value.

My invention may be more readily understood with reference to the accompanying drawing which shows a schematic wiring diagram illustrating one form in which my invention may be embodied.

In the embodiment of my invention illustrated, a motor designated at 9 is provided which, as herein shown, includes an armature 10, a series field winding 11, and a shunt field winding 12. Power is supplied to the motor by means of main line positive and negative conductors 14 and 15, respectively, the circuit being completed from the positive line 14 through main line contacts 16 of a main line contactor 1, a motor starting resistance 17, or through main line contacts 18 of a contactor 3. From said resistance or contactor contacts, current passes through a reverse switch 19, through armature 10, series field coils 11, main line contacts 20 of a main line contactor 2, to the negative conductor 15.

The shunt field 12 is connected between the negative side of the series field 11 and the positive line 14 by means of control circuit contacts 41 of the contactor 2 and operating coil 21 of a relay 5. The operating characteristics of the operating coil 21 of the relay 5 are such that said relay will not close until the shunt field current has reached a predetermined value.

A resistor 22 is connected between the armature circuit and the relay 5 and serves to absorb the self-induced voltage of the shunt field 12 upon opening of the shunt field circuit. This prevents arcing or burning of contact points 41 of contactor 2, and rupture of the shunt field insulation. Said resistor has a relatively small capacity since it is connected in the motor circuit in such a manner that current passes through it only when the motor circuit is open.

A control switch, generally indicated by reference character 23, is provided to start the motor under normal control. When said switch is turned to the "on" position, current flows from the positive conductor 14, through a contact segment 52 of said switch, and out through a contact segment 30, conductor 31, and through said conductor to a lockout coil 32 of an overload relay 6. From said lockout coil, current flows through a resistor 34, and conductor 35, to the negative line 15.

The purpose of the lockout coil 32 is to hold the overload relay 6 in an open position in case the main line current through the armature has become excessive and the overload relay has been tripped by its operating coil 36. The relative strength of the lockout coil 32 is very weak, being practically negligible in effect in the normal operation of the overload relay, but has sufficient strength to hold the overload relay open in case it has been opened by its main operating coil 36. The resistance 34 serves to protect said lockout coil.

When the control switch 23 is closed, current also flows out through a segment 24 of said switch, through conductor 25, control circuit contacts 26 of main line contactor 1, conductor 53, operating coil 27 of contactor 3, conductor 35, to the negative power conductor 15. This energizes the contactor coil 27 of the contactor 3 and opens the main power contacts 18 of said contactor and at the same time closes control circuit contacts 29 of said contactor. This operation inserts the main starting resistance 17 in series with the armature 10 of the motor 9.

When the control circuit contacts 29 of contactor 3 are in a closed position, current may also flow from the positive conductor 14, through contact segment 30 of the switch 23, through conductor 31, contacts 32a of overload relay 6, conductor 54, control circuit contacts 29 of contactor 3, conductor 38, operating coil 39 of contactor 2, to the negative line 15. This will actuate contactor 2, closing its main line contacts 20, and also its control circuit contacts 41.

Current will now flow from the positive line 14 through conductor 55, control circuit contacts 41 of contactor 2, coil 21 of relay 5, shunt field 12 of motor 9, contacts 20 of contactor 2, to the negative line 15 The construction of relay 5 as explained above is such that it will not close its contacts until the current in the shunt field 12 reaches a predetermined normal value, and will open its contacts when the shunt field current drops below a predetermined value.

When the relay 5 closes its contacts 45, another control circuit is completed as follows: Current flows from the positive line through contact segment 30 of operating switch 23, conductor 31, contacts 32a of overload relay 6, conductor 54, contacts 29 of contactor 3, conductor 38, contacts 45 of relay 5, conductor 51, operating coil 44 of main line contactor 1, conductor 35, to the negative power line 15. The energizing of coil 44 of contactor 1 actuates said contactor, closing its main power contacts 16 and opening its control circuit contacts 26. The closing of main line contact segments 16 of contactor 1 causes current to flow from the positive power conductor 14, through contacts 16, coil 48 of relay 4, coil 36 of overload relay 6, starting resistance 17, armature 10 and series field coil 11 of motor 9, main power contacts 20 of contactor 2, to the negative conductor 15. This causes the motor to start but it must be noted that the motor was not permitted to start until the shunt field current had reached its predetermined normal value which was sufficient to actuate relay 5, and it must also be noted that the resistance 17 was connected in the armature circuit before the motor 9 was permitted to start.

The armature current which flows through coil 48 of relay 4 under all conditions is sufficient to actuate relay 4. When this relay operates, its contacts 49 close. Current may then flow from the positive power conductor 14, through control switch 23, contact 30, line 31, contact segments 32a of overload relay 6, protective resistance 33, contacts 49 of relay 4, and conductor 50. At this point, the current divides, one portion going through coil 44 of relay 1, and conductor 35, to the negative line 15; the other portion going through conductor 51, contacts 45 of relay 5, and coil 39 of contactor 2, to the negative line. Only a small amount of current will flow through resistance 33 and contacts 49 as yet, however, due to the fact that they are short-circuited by control circuit contacts 29 of relay 3 and contacts 45 of relay 5.

Returning now to the sequence in the circuit where contactor 1 was actuated, in addition to closing its main contacts 16, it also opened its control circuit contacts 26. The opening of contacts 26 de-energizes coil 27 of relay 3. The de-energizing of coil 27 of relay 3 causes its main line contacts 18 to close and its control circuit contacts 29 to open. Relay 3 is of a time-delay type (well known to those skilled in the art) and does not open immediately upon the de-energizing of its operating coil 27 but opens after a predetermined interval of time. After this short predetermined length of time, it operates, thus closing its main line contacts 18 and opening its control circuit contacts 29. The closing of contacts 18 shorts the starting resistance 17, thus throwing motor 9 directly across the line. At this same time, the opening of contacts 29 of relay 3 removes the short circuit from resistance 33, thus placing this protective resistance in the circuit which supplies energy to the operating coils 44 and 39 of main line contacts 1 and 2, respectively. The circuit is now in its normal running position.

Referring now in particular to the novel means for preventing the starting of motor 9 directly across the line when the power has been restored after a temporary interruption, the series relay 4 is provided. Said series relay is a non-polarized type of relay and is so adjusted that it will pick up and close the contact segments 49 on the normal starting or running current of the motor. Its adjustment is also such that the contacts 49 will open when the current through the operating coil 48 drops to less than 1% of the full motor load. The operating coil 48 is connected in the positive side of the armature circuit of the motor 9. The current flowing through the armature circuit of motor 9 under all running conditions will be sufficient to hold contacts 49 of said relay 4 in a closed position; but should there be an interruption of power on main line conductor 14, current will immediately cease to flow through operating coil 48 of relay 4, and as the motor at this point will start to act as a generator, it will attempt to generate a voltage and supply this voltage to its control apparatus. This will cause an actual reversal of current through coil 48 of relay 4. This reverse current will be of small magnitude since it only supplies energy to the various operating coils of the control apparatus and in no case does it exceed 1% of the full load current of the motor. When this reversal takes place, coil 48 of relay 4 will be de-energized and contacts 49 will open.

The regenerative current tending to operate the control system at this point is not of sufficient magnitude to again actuate coil 48 of relay 4 and thus relay 4 will maintain its contacts 49 in an open position. As was pointed out above, the only available source of power for operating coils 44 and 39 of main line contactors 1 and 2 was through contacts 49 of relay 4. Thus, when relay 4 opens, the operating coils of contactors 1 and 2 are de-energized and both of these contactors open, thus completely disconnecting motor 9 from both the positive and negative lines. As this happens, shunt field 12 of motor 9 will discharge its energy through coil 21 of relay 5, through resistance 22, armature 10, and series field 11. Contacts 45 of relay 5 will thus open immediately. It may now be observed that all contactors and relays of the control circuit are in the same position as they were before closing operating switch 23 to start the motor. This condition has been accomplished regardless of the coasting speed of armature 10 in motor 9, and regardless of the magnitude of the generated voltage which it attempted to produce. It may now be observed that when power is again applied to main power conductor 14, that the motor will start normally and in the same manner that it would start had the control switch 23 been opened for a short period of time and again closed.

It may thus be seen that a simplified control system has been provided for an electric motor which is especially adapted to prevent starting of the motor directly across the line after the circuit has once been interrupted and which will not permit the circuit through the motor to be completed until the current flowing through the shunt field reaches a predetermined normal value.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a motor control system, the combination of a source of power, a motor having an armature and a shunt field winding, a main line circuit leading from said source of power to said armature including a positive and negative conductor, a control circuit for connecting said motor to the main line circuit, a manually operable control switch, a series relay having an operating coil connected in series with said shunt field winding and adapted to stay open until the current in said shunt field reaches a predetermined normal value, electrically operable contactors in said control circuit operable by said relay for connecting said armature to the main line circuit when the current in said shunt field reaches a predetermined normal value and disconnecting said armature from said circuit when the current in said shunt field is reduced below this value, and means operable upon the breaking of the main line circuit for automatically breaking said control circuit and causing said control circuit to open to a normal open position so as to again connect the motor to the power line through the resistance, upon return of the normal power supply to the main line circuit and the building up of the current in said shunt field to a predetermined normal value.

2. In a motor control system, the combination of a source of power, a motor having an armature and a shunt field winding, a main line circuit leading from said source of power to said armature including a positive and negative conductor, a control circuit for automatically connecting said motor to the main line circuit including a manually operable control switch, a series relay having an operating coil connected in series with said shunt field winding and adapted to stay open until the current in said shunt field reaches a predetermined normal value, electrically operable contactors in said control circuit operable by closing of said relay for connecting said armature to the main line circuit when the current in said shunt field reaches a predetermined normal value and disconnecting said armature from said circuit when the current in said shunt field is reduced below this value, and a current failure relay operable upon the breaking of the main line circuit for automatically breaking said control circuit and causing said control circuit to open to a normal position so as to connect the motor to the power line through a resistance upon return of the normal power supply to the motor and the building up of the current in said shunt field to a predetermined normal value.

3. In a motor control system, the combination of a source of power, a motor having an armature and a shunt field winding, a main line circuit leading from said source of power to said armature including a positive and negative conductor, a control circuit for connecting said motor to the source of current supply including a manually operable control switch for closing said control circuit, a series relay having an operating coil connected in series with said shunt field winding and adapted to stay open until the current in said shunt field reaches a predetermined normal value and then close, electrically operable contactors in said control circuit operable by closing of said relay for connecting said armature to the source of current supply when the current in said shunt field reaches a predetermined normal value, and disconnecting said armature from said circuit when the current in said shunt field is reduced below this value, and a current failure relay having its operating coil in the positive side of the main operating circuit and operable upon the breaking of said circuit for automatically breaking said control circuit and causing said control circuit to open to a normal position so as to connect the motor to the power line through the resistance upon return of the normal power supply to the motor and the building up of the current value of said shunt field to a certain predetermined normal value.

4. In a motor control system, a motor having an armature and shunt field winding, a source of power, a main line circuit leading from said source of power including a positive and negative conductor, a control circuit for automatically connecting said motor to said positive and negative conductors, a manually operable control switch for closing said control circuit, said control circuit including a contactor for closing the positive side of the line, a contactor for closing the negative side of the line, another contactor for cutting resistance out of the motor circuit, a series relay in series with said shunt field and the positive side of the line, said relay being so arranged as to close when the current through said shunt field reaches a predetermined normal value to close said main line contactor on the positive side of the line, and open when said shunt field current falls below this value, and means to open said control circuit on failure of line current and thus open said main line contactors so the motor will be automatically started through its resistance upon return of the normal power supply and the building up of the current in said shunt field to a predetermined normal value.

5. In a motor control system, a motor having an armature and shunt field winding, a source of power, a main line circuit leading from said source of power including a positive and negative conductor, a control circuit for automatically connecting said motor to said positive and negative conductors, a manually operable control switch for closing said control circuit, said control circuit including a contactor for closing the positive side of the line, a contactor for closing the negative side of the line, another contactor for cutting resistance out of the motor circuit, a series relay in series with said shunt field and the positive side of the line, said relay being so arranged as to close when the current through said shunt field reaches a predetermined normal value to close said main line contactor on the positive side of the line, and open when said shunt field current falls below this value, a resistance connected between said shunt field and armature circuits to absorb the self-induced voltage of said shunt field upon the breaking of the circuit to said motor, and means to open said control circuit on failure of line current and thus open said main line contactors so the motor will be automatically started through its resistance upon return of the normal power supply and the building up of the current in said shunt field to a predetermined normal value.

6. In a motor control system, a motor having an armature and shunt field winding, a source of power, a main line circuit leading from said source of power including a positive and negative conductor, a control circuit for automatically connecting said motor to said positive and negative conductors, a manually operable control switch for closing said control circuit, said control circuit including a contactor for closing the positive side of the line, a contactor for closing the negative side of the line, another contactor for cutting resistance into or out of the motor circuit, a series relay in series with said shunt field and the positive side of the line, said relay being so arranged as to close when the current through said shunt field reaches a predetermined normal value to permit said main line contactor on the positive side of the line to close, and open when said shunt field current falls below this value to open the circuit to said contactor, and a current failure relay operable on failure of line current, to open said control circuit and thus open said main line contactors so the motor will be automatically started through its resistance upon return of the normal power supply and the building up of the current in said shunt field to a predetermined normal value.

7. In a motor control system, a motor having an armature and shunt field winding, a source of power, a main line circuit leading from said source of power including a positive and negative conductor, a control circuit for automatically connecting said motor to said positive and negative conductors, a manually operable control switch for closing said control circuit, said control circuit including a contactor for closing the positive side of the line, a contactor for closing the negative side of the line, another contactor for cutting resistance into or out of the motor circuit, a series relay in series with said shunt field and the positive side of the line, said relay being so arranged as to close when the current through said shunt field reaches a predetermined normal value to permit said main line contactor on the positive side of the line to close, and open when said shunt field current falls below this value to open the circuit to said contactor, a resistance connected between said shunt field and armature circuits to absorb the self-induced voltage of said shunt field upon the breaking of the circuit to said motor, and a current failure relay operable on failure of line current, to open said control circuit and thus open said main line contactors so the motor will be automatically started through its resistance upon return of the normal power supply and the building up of the current in said shunt field to a predetermined normal value.

8. In a motor control system, a motor having an armature and shunt field winding, a source of power, a main line circuit leading from said source of power including a positive and negative conductor, a control circuit for automatically connecting said motor to said positive and negative conductors, a manually operable control switch for closing said control circuit, said control circuit including a contactor for closing the positive side of the line, a contactor for closing the negative side of the line, another contactor for cutting resistance into or out of the motor circuit, a series relay in series with said shunt field and the positive side of the line, said relay being so arranged as to close when the current through said shunt field reaches a predetermined normal value and permit said main line contactor on the positive side of the line to close, and open when said shunt field current falls below this value, said contactor for cutting resistance into or out of the motor circuit being adapted to close as said contactor in the positive side of the line closes at a delayed time interval, and a current failure relay having its operating coil in the positive side of the line and being operable on failure of line current to open said low potential circuit, and thus open said main line contactors so the motor will be automatically started through its resistance upon return of the normal power supply and the building up of the current in said shunt field to a predetermined normal value.

9. In a motor control system, the combination of a source of power, a motor having an armature and a shunt field winding, a main line circuit leading from said source of power to said armature including a positive and negative conductor, a resistance in said circuit, a control circuit for connecting said motor to said positive and negative conductors through said resistance and cutting said resistance out of the circuit after a predetermined time interval, said control circuit including a manually operable control switch, a series relay having an operating coil connected in series with said shunt field winding and adapted to stay open until the current in said shunt field reaches a predetermined normal value, an electrically operable contactor controlled by said relay for connecting said armature to the main line circuit when the current in said shunt field reaches a predetermined normal value and disconnecting said armature from said circuit by opening of said relay when the current in said shunt field is reduced below this value, and a relay having its operating coil in series with said armature and the positive side of the line for automatically breaking said control circuit upon breaking of the main line circuit irrespective of whether said motor is operating as a motor or generator, for opening said contactor and causing said control circuit to open to a normal open position so as to again connect said motor to the power line through a resistance, upon return of the normal power supply to the main line circuit and the building up of current in said shunt field to a predetermined normal value, while said manually operable control switch is in an open position.

10. In a motor control system, the combination of a source of power, a motor having an armature and a shunt field winding, a main line circuit leading from said source of power to said armature including a positive and negative conductor, a resistance in said circuit, a control circuit for connecting said motor to said positive and negative conductors through said resistance for starting and automatically cutting said resistance out of the circuit for running, said control circuit including a manually operable control switch, a series relay having an operating coil connected in series with said shunt field winding and adapted to stay open until the current in said shunt field reaches a predetermined normal value, a resistance connected between the circuit to said armature and said shunt field to absorb the self-induced voltage of said shunt field upon the breaking of the circuit to said motor, a contactor in said control circuit controlled by said relay, said contactor having its operating coil connected in said control circuit and in series with the contacts of said relay and including main line contacts adapted to connect said armature to said positive conductor upon closing of said shunt field circuit and when the current in said shunt field reaches a predetermined normal value, and means operable upon the breaking of the main line circuit for automatically breaking said control circuit and causing said control circuit to open to a normal open position so as to again connect said motor to the power line through said resistance without operation of said control switch upon the return of the normal power supply to the main line circuit and the building up of the current in said shunt field to a predetermined normal value.

11. In a motor control system, the combination of a source of power, a motor having an armature and a shunt field winding, a main line circuit leading from said source of power to said armature including a positive and negative conductor, a resistance in said circuit, a control circuit for connecting said motor to said positive and negative conductors through said resistance and cutting said resistance out of the circuit after a predetermined time interval, said control circuit including a manually operable control switch, a series relay having an operating coil connected in series with said shunt field winding and operable by current in said shunt field so it will not close until the current in said shunt field reaches a predetermined normal value, a resistance connected between the circuit to said armature and relay to absorb the self-induced voltage of said shunt field upon breaking of the motor circuit, a contactor in said control circuit controlled by said relay, said contactor having its operating coil connected in said control circuit and in series with the contacts of said relay and including main line contacts adapted to connect said armature to said positive conductor upon closing of said series relay when the current in said shunt field reaches a predetermined normal value, and a relay having its operating coil in series with said armature and the positive side of the line for automatically breaking said control circuit upon breaking of the main line circuit irrespective of whether or not said motor is operating as a generator, for opening said contactors and causing said control circuit to open to a normal open position so said motor may again be connected to the power line through said first-mentioned resistance upon return of the normal power supply to the main line circuit and the building up of current in said shunt field to a predetermined normal value without operation of said manual control switch.

12. In a motor control system, a source of power, a main line circuit leading from said source of power including a positive and negative conductor, a motor having an armature and a shunt field winding, a resistance adapted to be connected in series with said motor and said positive conductor, a control circuit for connecting said motor to the source of power through said resistance and automatically cutting said resistance from the circuit including a manually operable control switch, a contactor adapted to make or break the positive side of the line, another contactor adapted to make or break the negative side of the line, a third contactor adapted to close at a predetermined time interval after said other contactors close to permit said motor to start through said resistance and cut said resistance from the motor circuit, said contactors each having their operating coils in said control circuit, said first-mentioned contactor having a set of auxiliary contacts adapted to break said control circuit and disconnect the operating coil of said third-mentioned contactor from the circuit to permit said contactor to close after a predetermined time interval to short circuit said resistance out of the motor circuit, said second-mentioned contactor having a set of contacts in the circuit to said shunt field and having its operating coil in series with said relay contacts, said first-mentioned contactor being controlled by said relay and adapted to connect said armature to said positive conductor when the circuit in said shunt field reaches a predetermined normal value and disconnect said armature from said conductor when the current in said shunt field is reduced below this value, and another relay in said circuit having its operating coil in said positive line and adapted to break said control circuit upon failure of current in said main line.

CLAUDE O. WOOD.